(12) United States Patent
Chen et al.

(10) Patent No.: US 7,377,975 B2
(45) Date of Patent: May 27, 2008

(54) PIGMENT FOR USE IN INKJET RECORDING MEDIUM COATINGS AND METHODS

(75) Inventors: Ching-Yih Chen, Macon, GA (US); Ricky L. Giddens, Cochran, GA (US); Richard D. Carter, Macon, GA (US)

(73) Assignee: J.M. Huber Corporation, Edison, NJ (US)

( * ) Notice: Subject to any disclaimer, the term of this patent is extended or adjusted under 35 U.S.C. 154(b) by 67 days.

(21) Appl. No.: 11/523,964

(22) Filed: Sep. 20, 2006

(65) Prior Publication Data

US 2007/0014941 A1    Jan. 18, 2007

Related U.S. Application Data

(62) Division of application No. 10/462,779, filed on Jun. 17, 2003, now Pat. No. 7,172,651.

(51) Int. Cl.
| | |
|---|---|
| C09C 1/02 | (2006.01) |
| C04B 14/00 | (2006.01) |
| C04B 26/06 | (2006.01) |
| C04B 24/26 | (2006.01) |
| B41M 5/00 | (2006.01) |
| B41M 5/40 | (2006.01) |
| C08L 31/00 | (2006.01) |
| C08L 29/04 | (2006.01) |
| B60C 1/00 | (2006.01) |
| C08F 297/02 | (2006.01) |

(52) U.S. Cl. .................. 106/464; 106/486; 106/487; 428/32.1; 428/32.2; 428/32.3; 524/437; 524/556; 524/557; 524/563; 524/571; 524/577

(58) Field of Classification Search ............... 106/464, 106/486, 487; 428/32.1–32.3; 524/437, 524/556, 557, 563, 571, 577
See application file for complete search history.

(56) References Cited

U.S. PATENT DOCUMENTS

| 5,037,508 A | * | 8/1991 | Hyder et al. ............. 162/181.2 |
| 5,534,057 A | * | 7/1996 | Harrison et al. ............ 106/486 |
| 6,183,851 B1 | * | 2/2001 | Mishima ................... 428/32.34 |
| 6,492,005 B1 | * | 12/2002 | Ohbayashi et al. ........ 428/32.29 |
| 2002/0039639 A1 | * | 4/2002 | Kondo et al. ................ 428/195 |
| 2004/0033377 A1 | * | 2/2004 | Koenig ....................... 428/458 |

* cited by examiner

*Primary Examiner*—Patricia L. Hailey
(74) *Attorney, Agent, or Firm*—William Parks

(57) ABSTRACT

Pigment suitable for use in coating compositions for inkjet recording media. Surfaces of an inorganic particulate are interacted with a water-soluble polyvalent metal salt in an aqueous medium. The treated particle surfaces have a significant cationic surface charge imparted to them. The salt is a salt of a metal of Group II or Group III of the Periodic Table. Inkjet recording media treated with a coating composition containing the above pigment provide high density, fast-drying, and non-feathering ink images with suitable water fastness, while the coating compositions also offer cost advantages and improved rheology at higher pigment levels over coatings based on silica pigments.

15 Claims, 4 Drawing Sheets

PIGMENT FOR USE IN INKJET RECORDING MEDIUM COATINGS AND METHODS

CROSS-REFERENCE TO RELATED APPLICATIONS

This is a divisional of U.S. application Ser. No. 10/462,779, filed Jun. 17, 2003 now U.S. Pat. No. 7,172,651, the content of which is incorporated herein by reference in its entirety for all purposes.

FIELD OF THE INVENTION

This invention relates to pigments for ink recording medium coating compositions, especially adapted for inkjet printing, and methods of making and using the pigments and coating compositions.

DESCRIPTION OF THE RELATED ART

Inkjet recording processes represent one of the most important and widely used technologies for high-speed electronic printing. Inkjet printers typically include a plurality of nozzles connected to a supply of liquid-based ink. The nozzles can be energized to spray ultrafine liquid droplets of the ink upon demand. Typically, a series of the nozzles is controlled to emit the droplets of ink in the pattern of characters or images on a paper surface. Thermal bubble and piezoelectric printers are the two prevailing primary inkjet technologies currently used by printer manufacturers. Conventionally, inkjet printers have used an aqueous-based ink. Typical inks contain a minor amount of ink pigment and a major amount of water as a vehicle.

The paper used on an inkjet printer greatly determines the quality of the image printed. Papers suitable for inkjet printing typically involve a base paper coated with a composition that improves the ink reception properties of the paper. Base paper for ink receptive coatings is generally made from bleached chemical pulp to which fillers, dyes, and, if needed, sizing agents and strength enhancers are added. The conventional ink-receptive coating composition applied to the base paper generally includes a binder and porous fine powder capable of absorbing ink coated on a paper surface. Matte and high gloss inkjet papers are currently available at a significant price premium over uncoated papers.

Brightness and absorption properties of paper greatly affect image quality. Standard uncoated papers generally are not suitable for high-resolution inkjet printing. A rough or course paper scatters light in more directions than a smoother surfaced paper. The smoother paper makes images printed thereon appear brighter all other factors being equal. Regarding absorption, ideally, when the ink is sprayed onto the paper, it will stay in a tight, symmetrical dot. The ink should not be absorbed too deeply by the paper because the sprayed dot will lose optical density at the paper surface and tend to "feather." "Feathering" means the sprayed dot of ink is absorbed by the paper in a manner such that it spreads out laterally in an irregular manner to cover a slightly larger area than intended. As a result, the printed image looks somewhat fuzzy, especially at the edges. High quality inkjet paper ideally would be precoated with a film that keeps the ink close to the paper surface to give a printed image of enhanced optical density, while permitting the aqueous medium or vehicle to be absorbed further into the body of the paper to accelerate setting and drying of the ink. This supports faster print rates and reduces set-off or ink transfer problems created by low vehicle absorbency. Therefore, improved print quality and accelerated ink drying times are desired. A proper balance of these properties is difficult to achieve, especially at higher printer resolutions and smaller dot diameters.

Currently silicas are the most widely used coating pigment for making coated inkjet paper. Structured silicas are synthetic products. The silicas generally create an acceptable balance of inkjet printability and ink drying attributes. However, the prior use of silicas for this purpose has drawbacks. Silicas are relatively costly to manufacture. In addition to the relative high cost of silicas, mill dusting associated with silicas during coating make down must be dealt with as a material handling issue. Furthermore, silicas have high surface areas, and coatings containing them tend to develop viscosity very rapidly with small increases in silica content. Consequently, for inkjet paper application coatings using silicas, the silica solids content typically is formulated to a relatively low value, while relatively large amounts of binder are required to achieve a sufficiently high binding strength. The increased coating viscosities encountered at lower pigment levels associated with the use of silicas as the absorptive pigment in paper coatings makes it difficult to manipulate coat weights at these low solids levels. The high surface area of the silica is useful in that it creates an open structure in a continuous binder phase. This open structure permits fast absorption of the ink leading to good ink drying properties on an inkjet printer.

U.S. Pat. No. 4,478,910 describes inkjet recording paper comprising a base sheet with a specific sizing degree having a coating layer comprising fine silica particles and a water-soluble polymeric binder.

U.S. Pat. Nos. 6,140,406 and 6,129,785 describe a coating composition for an inkjet recording medium comprising an aqueous suspension of absorptive silica pigment, polyvinyl alcohol binder, and a cationic fixing agent. The pigment preferably is a mixture of 75% or more silica gel having a pore volume of 0.5-2.0 cc/g, and 10% or more of alumina or alumina trihydrate.

U.S. Pat. No. 5,985,424 describes a coated paper for inkjet printing in which a base coat having good absorbency for ink vehicle and a top coat is an ink receptive coating. In a preferred embodiment the base coat contains a mixture of precipitated calcium carbonate and calcined clay dispersed in a standard coating binder, while the topcoat includes fumed or pyrogenic silica dispersed in an emulsion prepared from styrene polymerized in the presence of polyvinyl pyrrolidone (a non-standard binder).

Other types of pigments besides silica have been proposed for coating compositions for paper. For instance, conventional calcium carbonate powders used as a paper coating pigment do not functionally improve print characteristics of inkjet-coated papers. Consequently, conventional calcium carbonate can be beneficially added to paper coatings to impart optical effects, e.g., to enhance brightness and smoothness, but typically adversely affects printability and ink drying properties.

U.S. Pat. No. 6,441,076 describes production of a paper coating composition applicable to inkjet paper in which the composition contains a high solids level of ultrafine particle size calcium carbonate and dissolved fine particle size, partially hydrolyzed, low molecular weight polyvinyl alcohol.

In this application the surface area of the calcium carbonate is very high in order to mimic the performance of a high surface area silica. Still color reproduction and ink drying are not consistent with a silica coated sheet.

U.S. Pat. No. 5,397,619 describes an ink jet recording paper comprising a base paper having a recording layer on at least one surface containing at least 40 weight % of a pigment and not more than 60 weight % of binder, having a surface roughness by ten point height on the recording layer surface of no more than 5 Φm and an air permeability of nor more than 1,000 seconds. The pigment can be silica, white carbon or silica gel obtained by wet method, superfine silica obtained by dry method, or a calcium carbonate silica complex having a particle structure consisting essentially of silica crystallized in calcium carbonate crystals.

U.S. Pat. No. 6,274,226 describes mesoporous silicoaluminate pigments, which are formulated with polyvinyl alcohol as binder, for use in ink jet and carbonless paper coatings.

U.S. Pat. No. 5,997,625 describes a coating pigment for ink jet printing comprising hydrous clay, a caustic leached calcined clay, and porous mineral.

U.S. Pat. No. 5,882,396 describes a paper coating composition for preparing a coated paper for inkjet printing including a composite pigment selected from one or more of kaolin, calcined kaolin, dolomite, ground natural calcium carbonate, precipitated calcium carbonate, calcium sulfate, or talc preferably comprising 1-50% by weight coarse pigment and from 99-50% fine pigment of certain prescribed particulate size distributions, and a hydrophilic polymeric adhesive.

U.S. Pat. No. 4,554,181 describes an inkjet recording sheet having a bicomponent cationic recording surface, comprising a substrate having a recording surface containing a cationic polymer that is used in combination with a water-soluble polyvalent metal salt in which the polymer provides the surface with cationic groups for ionically interacting with an anionic dye and insolubilizing it. To the extent the coating compositions contain pigments, the '181 patent does not describe any significance attached to the order of admixing that type of component with the other ingredients, and indicates a single pot mixing procedure for formulating the coating compositions. In addition, the '181 patent only describes the use of non-anionic type binders in coating compositions.

Most cationic polymers are slightly colored in their liquid form ranging from pale orange colors to deep orange-red colors. The inherited colors from cationic polymer ingredients used in paper coating compositions can affect the final coated sheet brightness and shade. Further the use of specific cationic pigments leads to differential reactivity with colored ink jet components which creates good ink hold out but can change the color gamut of the picture that is being printed. It would be desirable to provide coating compositions using reduced levels of cationic polymers, which can still meet performance requirements.

A need exists for less costly pigment alternatives to synthetic silicas for paper coating applications, especially inkjet paper, which provide desirable coating rheology for high solids applications along with uniform printability, including but not limited to color reproduction, print density and ink drying. It would also be desirable if these coating pigments could function with standard paper coating binders and be applied on modem paper machine at high speed.

SUMMARY OF THE INVENTION

The present invention relates to a pigment suitable for use in ink recording medium coating compositions, comprising an inorganic particulate having treated surfaces obtained by contact made between surfaces of the inorganic particulate with a water-soluble polyvalent metal salt in an aqueous medium, wherein the treated surfaces have a cationic surface charge and the salt is a salt of a metal of Group II or Group III of the Periodic Table.

Papers coated with treatments containing the pigments provide rapid ink vehicle absorption, dye fixation on the surface, and strong surface properties attributable to the low binder demand of the coating. Inkjet recording media treated with a coating composition containing the above pigment provide high density, fast-drying, and non-feathering ink images with enhanced water fastness. The pigments of this invention are effective functional replacements for relatively more expensive siliceous pigments and can be applied at high solids on a standard paper machine.

In one embodiment, the coating compositions of this invention can contain about 45% to about 70% by weight, and more particularly about 50% to about 65% by weight, of the surface treated pigment, and still are processable and perform well.

In one embodiment of this invention, coating compositions are prepared by a method in which inorganic pigments are separately pretreated with a polyvalent salt of a metal of Group II or Group III of the Periodic Table before the pigment is contacted with a cationic polymer effective that the water-soluble polyvalent metal salt contacts surfaces of the inorganic particulate to provide a surface treated inorganic particulate having a cationic surface charge on the contacted surfaces, and then in subsequent processing the surface treated pigment is combined with a cationic polymer in a coating composition. This method has been discovered to permit solids levels as high as 60% or more by weight to be made possible in coating compositions without experiencing gelling problems. Preferably, the cationic polymer comprises a quaternary amine compound, and more preferably an epichlorohydrin polyamine compound.

The term "gelling", for purposes herein, means a high degree of pigment coagulation is experienced such that the mixing operation can not be continued due to the rapid, high viscosity buildup.

In another embodiment, pigments are separately admixed with a cationic polymer comprising a quaternary amine compound before the mineral is contacted and surface treated with a salt of a metal of Group II or Group III of the Periodic Table, which has been discovered to permit solids levels as high as 45% or more by weight to be made possible in coating compositions without experiencing gelling problems.

If these sequences of admixture of the mineral according to embodiments of this invention are not followed, it has been observed that at least 45% solids coating compositions are not achievable in coating compositions prepared using cationic polymers and pigments. In addition, the present invention makes it possible to reduce the amount of cationic polymer otherwise needed in coating compositions.

A more uniform coating appearance is also achieved using the coating formulations of the invention. In addition, the present invention makes it possible to use reduced binder contents and standard binder types in inkjet coatings.

Simplicity in the formulation and reduced costs come from the reduction in the surface area of the pigment used in the present invention. The low surface area pigment of the present invention gains ink drying properties through coating structure. In one embodiment, proper ink interaction is achieved in an inkjet recording medium using a coating pigment pursuant to an embodiment of this invention in which the pigment is derived from a relatively low surface area inorganic particulate, such as, for example, precipitated calcium carbonate (PCC) or ground calcium carbonate (GCC) having a specific surface area of less than about 15 m$^2$/g. This capability attained is unexpected in view of the trend in the ink jet paper coating field towards use of high specific surface area calcium carbonates (viz., >30 m$^2$/g) in paper coatings. For purposes herein, "specific surface area" is measured by BET method.

In addition, when the PCC or GCC, which is alkaline material, is treated with highly acidic polyvalent metal salt surface treatments according to an embodiment of the invention, such as aluminum chlorohydrate (ACH)(pH 4-5), surprisingly, the ACH does not dissolve the calcium carbonate particles during the surface treatment procedure. Moreover, the highly cationic charge formed at the particles surfaces by the ACH-treatment is retained even at high alkaline pH values after the surface treatment without causing an undue increase in Ca$^{+2}$ content, as an indicator of particle dissolution. A paper coated with this pigment behaves as if the surface is cationic in nature. As a consequence, high-density images can be printed on the coated paper, especially by using an inkjet ink dye that is anionic in character. In addition, the use of ACH results in a uniform absorption of all ink dyes leading to more faithful color reproduction.

Also, the cationically-charged pigments of the present invention can surprisingly be used with an anionic binder in paper coating compositions without incurring high viscosity. Consequently, the pigments can be used with standard anionic latexes, such as those based on styrene-butadiene rubber binder, polyvinyl acetate binder, and so forth. Polyvinyl acetate and other anionic latexes also are attractive from a cost and convenience standpoint. As a result, the pigment solids content of the paper coating compositions can be increased as high as 45% or more by weight, while concomitantly reducing the binder content level, which supports usage of the coating compositions on modern paper machines.

The low specific surface area pigment and low binder content of the paper coating compositions yields enhanced hiding power, which is manifested as a high coating whiteness considered attributable to the coating opacity attained over the print substrate. In addition, the pigments do not impart off-colors while having low odor and low fluid viscosity in aqueous suspension form.

The pigments of the present invention can be used to enhance the printability of a wide variety of print substrates, such as coated and uncoated paper sheets and rolls, plastic fiber paper, plastic films, metal foils, coated boards, uncoated boards, and so forth. Inkjet paper coatings for matte paper in particular can be advantageously formulated to employ the non-siliceous pigments according to the present invention. The pigments of the present invention also may be suitable for coating compositions for high gloss papers. The above benefits and advantages translate into a less costly paper coating composition for inkjet paper.

The present invention also relates to the coating formulation, as the coating formulation is quite unique in its use of anionic latex binders as well as the low levels of these binders in an ink jet coating.

DETAILED DESCRIPTION OF THE PREFERRED EMBODIMENTS

In accordance with the preceding summary, the present invention is directed to a unique surface treated pigment useful for paper coating compositions. The surface treated pigment has a cationic surface charge, which will effectively attract anionic ink dyes and the like. Among other things, papers treated with coatings containing surface treated pigments described herein meet commercial demands for good quality, water-fastness, and high speed printability on paper or other print substrates coated with the compositions based on the surface-treated pigments described herein. The surface-treated pigments described herein also provide a low cost alternative to silica pigments, and paper coatings containing them have lower binder demands and improved rheology. In addition, the present invention includes techniques for preparing the coating compositions including the surface treated pigments and cationic polymers which make it possible to increase solid levels. As such, the invention makes possible lower cost, high solids, yet highly effective coated inkjet papers and other substrates suitable for digital printing.

Figure 1:
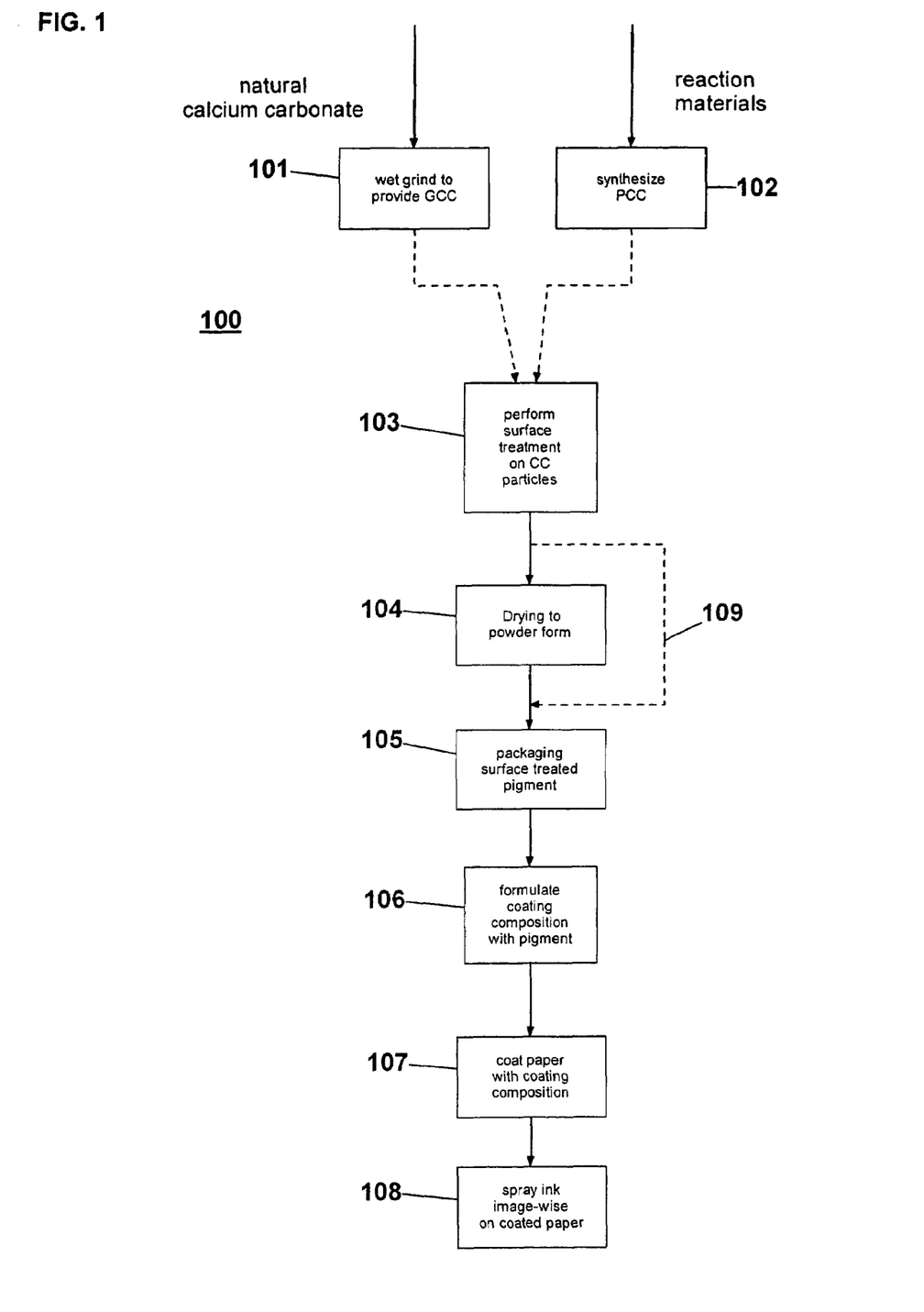
FIG. 1 is a flow chart of a process scheme for making and using a pigment and paper coating according to an embodiment of the invention.

Referring to FIG. 1, an illustrative, non-limiting process scheme 100 for making a surface treated pigment having a significant cationic surface charge, and uses of that pigment in other intermediate and final products is set forth.

The inorganic particulate starting material is a whitening agent in solid powder form. In one preferred embodiment, the inorganic particulate comprises calcium carbonate (CaCO$_3$) particles. The particulate calcium carbonate is supplied either as mechanically treated natural calcium carbonate material, or as a chemically synthesized reaction product.

The calcium carbonate particles can be ground natural calcium carbonate (GCC), as indicated in step 101. Marble, limestone, chalk, and coral are natural source materials for calcium carbonate. These natural sources of calcium carbonate are subjected to mechanical treatments including comminution to provide a particulate form of the material, such as ultrafine ground calcium carbonate (UFGCC). Typically, a nondispersed grind is performed or alternatively a fugitive dispersant may be used for the grind.

Alternatively, the calcium carbonate particles can be supplied as a synthetic reaction product in the form of precipitated calcium carbonate (PCC), as indicated in step 102. A wide variety of calcium carbonate particles sizes and particle shapes can be chemically produced via the precipitation processes. The precipitated calcium carbonate products have a more uniform particles size distribution, and a higher degree of chemical purity, than commercially available GCC. However, GCC may be less costly.

Calcium carbonate is commonly precipitated in the form of calcite, in which the crystals are typically either rhombohedral, cubic or scalenohedral in shape, or in the form of aragonite, which is acicular. Vaterite is another precipitated form of calcium carbonate known in the art that is metastable.

Precipitated calcium carbonate generally is manufactured in a reactor by carbonating a hydrated lime slurry or "milk of lime," which is produced from the slaking of quick lime (CaO), followed by dewatering/filtering the reaction product and milling the product to a desired particle size and distribution. Suitable techniques for precipitating calcium carbonate are generally known and applicable here. Although generally not required for this application, the raw synthesized calcium carbonate particles could also be screened or milled to a desired size distribution range by processing techniques described, for example, in U.S. Pat. Nos. 6,143,065 and 6,402,824 (Freeman et al.), which descriptions are incorporated herein by reference.

The untreated calcium carbonate particles then can be supplied to the surface treatment station of step 103 in a preexisting aqueous slurry form. Alternatively, the untreated calcium carbonate can be supplied for surface treatment in dry powder form, which is dispersed in an aqueous medium to form a slurry as an initial procedure of the surface treatment.

The untreated calcium carbonate particles supplied for surface treatment generally have a median particle size of about 0.1 µm to about 5.0 µm, and more particularly between about 0.5 µm to about 2.0 µm. The particle size distribution, as defined by slope (steepness factor), is preferably less than about 1.8. The term "slope" means the quotient value of the diameter value for which 75% of the particles are less than (as the numerator), divided by the diameter value for which 25% of the particles are less (as the denominator), where particle sizes are measured by a Sedigraph Particle Size Analyzer. The precipitated calcium carbonate (PCC) or ground calcium carbonate (GCC) generally has a specific surface area of less than about 15 m$^2$/g. The TAPPI Brightness of the calcium carbonate particles generally is at least about 96, both before and after surface treatment as described herein.

The inorganic white pigment starting material that is surface treatable according to this invention is not limited to calcium carbonate. For example, it also can be aluminum trihydrate (ATH) and/or magnesium hydroxide (Mg(OH)$_2$) particulates, and the like. However, calcium carbonate is especially preferred as it not only is conducive to the surface treatment used to impart cationic surface charge to the particles, as described herein, but calcium carbonate also enhances the opacifying, brightness, and resistance to yellowing and aging of coated paper using it.

The calcium carbonate particles supplied via step 101 or 102 are then subjected to a surface treatment step that imparts or increases cationic charge at the surfaces of the calcium carbonate particles to an advantageous level for print applications, as indicated in step 103.

The calcium carbonate pigment is surface treated with a water-soluble polyvalent metal salt of a metal of Group II or Group III of the Periodic Table dispersed in a common aqueous medium.

In one preferred embodiment, the polyvalent metal salt is aluminum chlorohydrate. For purposes herein, aluminum chlorohydrate is occasionally abbreviated as "ACH".

ACH has the chemical structure $Al_2(OH)_nCl_{6-n}$. ACH can be made by reacting hydrated alumina with hydrochloric acid according to the following general equation:
$2Al(OH)_3 + nHCl \rightarrow Al_2(OH)_nCl_{6-n} + nH_2O$, where $1 \leq n < 6$.

The relative activity of product is definable as (%)=n/6× 100. For purposes of this invention, the reaction product that is preferably used will be the product of a reaction performed to yield a product having an activity of greater than about 50%, or even 75%. For example, where "n" is 5, the chemical structure corresponds to $Al_2(OH)_5Cl$ (CAS Number 12042-91-0). ACH also is commercially available in powder or solution form, such as from Reheis, Berkeley, N.J. 07922, USA.

The ACH is added onto the surface of the calcium carbonate particles in an amount effective to provide a level of cationic surface charge enhancement that correlates into observable/measurable increases in print density or ink drying performance of inkjet papers coated with a coating composition containing the surface treated pigment. The addition level needed to attain such improvements can be determined empirically by applying the teachings provided herein. This ACH-addition level generally, but not necessarily always, ranges from about 0.1% to about 5%, based on dry weight of the calcium carbonate. The calcium carbonate preferably is treated with the ACH before its introduction into a paper coating composition and the ACH can be added in wet or dry form.

The increase in cationic charge imparted to the surface treated pigments by ACH-treatment is directly measurable qualitatively and quantitatively by use of a charge titration analyzer such as the Mµtek PCD02 particle charge detector.

It also is demonstrated by comparing the print properties, such as print density, ink drying, and so forth, of papers coated with the coating compositions containing the surface treated pigments with comparisons using the untreated pigment.

In addition, when the PCC or GCC, which is alkaline material, is treated with highly acidic polyvalent metal salt surface treatments according to an embodiment of the invention, such as aluminum chlorohydrate (ACH)(pH 4-5), quite surprisingly the ACH does not dissolve the calcium carbonate particles during the surface treatment procedure. Moreover, the highly cationic charge formed at the particles surfaces by the ACH-treatment is retained even at high alkaline pH values after the surface treatment without causing an undue increase in $Ca^{+2}$ content, as an indicator of particle dissolution. A paper coated with this pigment behaves as if the surface is cationic in nature. As a consequence, high density, water-fast images can be printed on the coated paper, especially by using an inkjet ink that is anionic in character, such that the pigment surfaces and ink have opposite and thus mutually attractive ionic charge. The beneficial, non-destructive interaction provided and observed between the surface of the calcium carbonate particles and the highly acidic ACH used to treat them according to this invention was unexpected.

The surface-treated calcium carbonate product obtained in step 103 is in slurry form. It is an aqueous dispersion of the surface-treated calcium carbonate particles produced at about 30% solids.

The slurry product of step 103 containing the surface treated particulate can be dewatered by a slurry drying technique suitable to provide a dried powder form of the surface treated inorganic particulate without reducing its efficacy. The dried powder can used as a pigment source ingredient in formulating paper coating compositions, as indicated in step 104. The pigments can be dried to powder form by spray drying or flash drying techniques. Equipment and conditions useful for this general purpose include those generally known and applied to particulate mineral slurries.

Alternatively, as indicated in step 109, the slurry resulting from the surface treatment of the pigment with the polyvalent metal salt while dispersed in the aqueous medium in step 103, can be used directly as pigment source ingredient in formulating paper coating compositions. This slurry can contain up to approximately 60%, or even 70%, by weight solids content composed of the surface treated pigments without encountering high viscosity related problems.

As a further alternative, dry ACH, which is commercially available, can be mixed with dry pigment powder in a dry blending operation. This dry mixture can be made down into slurry and produces the same surface-active calcium carbonate material.

In step 105, the dried powder form of pigment obtained through step 104 is packaged in any suitable and convenient manner. Alternatively, a slurry containing the surface treated pigment that is supplied directly from step 103 (step 109) can be packaged in a liquid leak-proof container and shipped and handled. In another alternative embodiment, packaging step 105 could be omitted altogether in scenarios where the surface-treated pigment is manufactured and used in a paper coating composition at the same or a nearby manufacturing facility. In that situation, the product may be transported in bulk form via conveyor, truck, or rail car (powder), and the like, or via pipeline (slurry), between the different manufacturing stations or sites.

In step 106, a paper coating composition is formulated with the surface-treated pigment in combination with a binder, and other optional additives.

Figure 2:
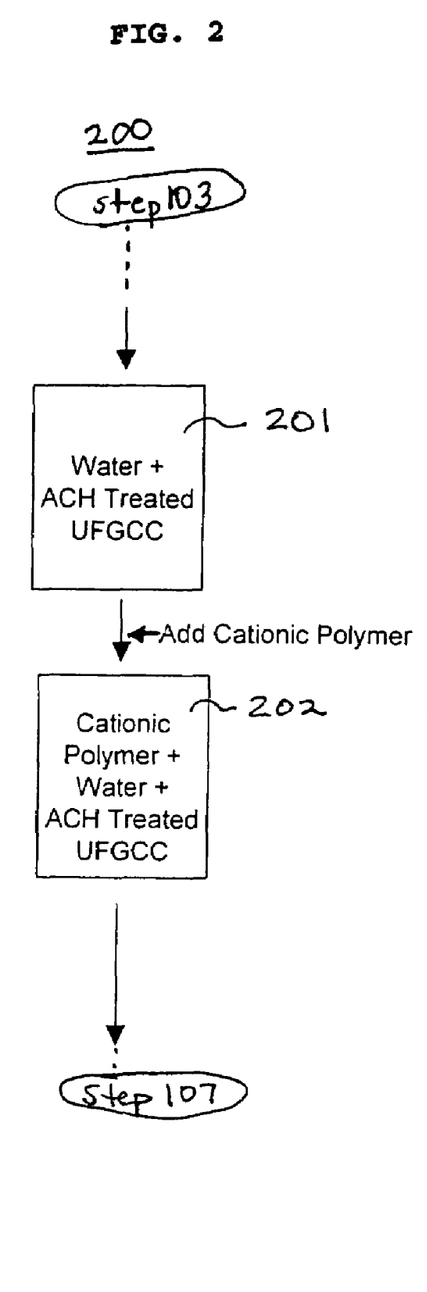
FIG. 2 is a flow chart of a process scheme for making a paper coating according to a particular embodiment of the invention.

In one preferred embodiment of this invention, as shown in the process scheme 200 of FIG. 2, coating compositions are prepared by a method in which inorganic pigments are separately pretreated with a polyvalent salt of a metal of Group II or Group III of the Periodic Table before the pigment is contacted with a cationic polymer effective that the water-soluble polyvalent metal salt contacts surfaces of the inorganic particulate to provide a surface treated inorganic particulate having a cationic surface charge on the contacted surfaces, similar to step 103 of FIG. 1. Thereafter, the surface-treated pigments are mixed with water in step 201 to provide a slurry, and then in subsequent processing step 202, which basically can correspond to step 106 in FIG. 1, the surface treated pigment slurry is combined with a cationic polymer in preparing a coating composition, or intermediate composition that can be added to a coating composition. The coating composition prepared in this manner can be used in paper coating procedure, such as step 107 in FIG. 1. This method has been discovered to permit solids levels of the surface-treated pigment as high as 60% or more by weight to be made possible in coating compositions. The cationic polymer preferably comprises a cationic quaternary amine compound, and more preferably is epichlorohydrin polyamine. In one embodiment, the coating compositions of this invention can contain about 50% to about 70% by weight of the ACH-surface treated pigment, and still remain processable (e.g., they do not gel, and perform well).

Diallyldimethylammonium chloride (DADMAC) also can be used as a cationic quaternary amine compound in the practice of this invention. Commercial examples of these a cationic quaternary amine compounds include, for instance, TRAMFLOC 864 by Tramfloc, Inc., Tempe, Ariz.; and Nalkat 7607 by Ondeo; and PRP 2550.

Figure 3:
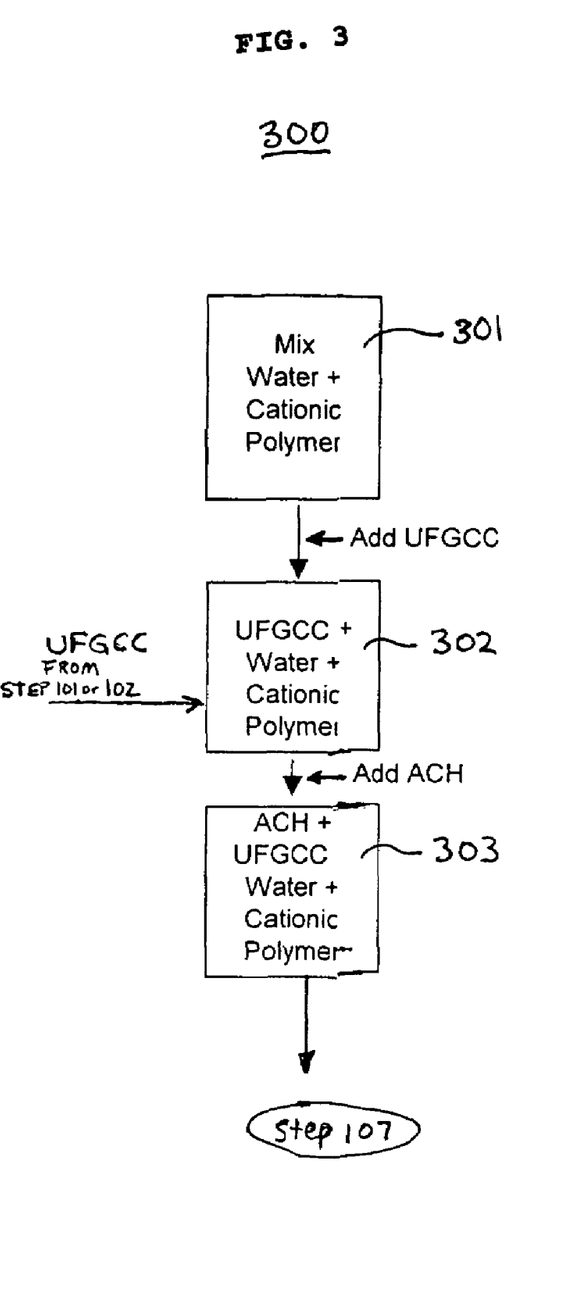
FIG. 3 is a flow chart of a process scheme for making a paper coating according to an alternative embodiment of the invention.

In another embodiment, illustrated in FIG. 3, a process scheme 300 is used in which a mixture of water and cationic polymer comprising a quaternary amine compound is prepared in step 301, which is combined with pigments that have not yet been surface treated yet with ACH in step 302 with thorough mixing to provide a uniform mixture. Thereafter, in step 303, the resulting aqueous mixture or slurry of cationic polymer and pigments is contacted and surface treated with the salt of a metal of Group II or Group III of the Periodic Table. This alternative method has been discovered to permit solids levels as high as 45% or more by weight to be made possible in coating compositions. In one embodiment, at least about a 45% by weight level of surface treated pigment is sustainable in a coating composition prepared by this alternative technique of the invention. The cationic polymer used in this embodiment comprises the quaternary amine compounds described above.

If these orders of admixture of the mineral according to embodiments of this invention are not followed, it has been observed that at least 45% pigment-content coating compositions are not achievable in coating compositions prepared using cationic polymers and pigments.

Therefore, this invention can incorporate inclusion of cationic polymers may also be practiced to reduce the overall cost of the coating formulation while maintaining the advantages seen in using a polyvalent metal ion treatment. Cationic polymer requirements for the coating formulations are reduced, and can even be eliminated, by the present invention.

The other additives can include commonly used categories of additives for coating compositions intended for use on inkjet paper, such as binder crosslinkers, sizing agents, dispersants, rheology modifiers, organic brighteners, starches, and so forth. Illustrations of some of these additives are provided herein.

Importantly, the cationic pigments of the present invention can be used with an anionic binder in paper coating compositions without incurring high viscosity. Consequently, the pigments can be used with anionic latexes, such as those based on styrene-butadiene rubber binder, polyvinyl acetate binder, and so forth. Polyvinyl acetate and other anionic latexes are additionally attractive from a cost standpoint.

Since the coating viscosity does not unduly increase when adding increasing levels of the surface treated pigment of the invention, the pigment solids content of the paper coating compositions can be formulated up to approximately 50% by weight, or even higher, while concomitantly reducing the binder content level, which supports usage of the coating compositions on modern paper machines. Enhanced slurry makedown solid levels are made possible by the surface treated pigments carrying the cationic charge according to the present invention.

In one aspect, a coating composition of the present invention includes, on a solids basis, the ACH-treated pigments in an amount of about 25 to about 70% by weight; an anionic binder in an amount of about 2 to about 15% by weight, and a cationic polymer in an amount of 0 to about 15% by weight. More particularly, a coating composition of the present invention includes, on a solids basis, the ACH-treated pigments in an amount of about 45 to about 60% by weight; an anionic binder in an amount of about 5 to about 12%, and a cationic polymer in an amount of about 5 to about 15% by weight.

In step 107, a print substrate is coated on at least one face or side, and typically both faces, with the coating composition formulated in step 106. The coating can be applied to a print substrate using suitable coating techniques including conventional paper coating techniques. The coating composition can be applied at low coat weight using a metering size press, or other suitable applicator means. In another embodiment of the invention, the surface treated pigment may be used alternatively or additionally as a paper filler incorporated into the base paper.

In step 108, an inkjet printer sprays ink image-wise on the coated paper or other print substrate. The coat weights generally are from 2 gsm (g/m$^2$) for one specific inkjet grade (in which the coating is normally applied at low solids) to greater than 10 gsm on higher quality inkjet grades. The coat weight is generally independent of the type of print substrate printed upon in sheet or roll form.

The print substrates to which this invention can be applied is not necessarily limited and includes coated paper and standard uncoated paper, in either discrete sheets or rolls; plastic fiber paper (e.g., TYVEK sheets); plastic films (e.g., vinyl plastic films); metal foils (e.g., aluminum foil); coated boards; uncoated boards; and so forth. Papers obtained from commercially available synthetic pulps and synthetic pulp/wood pulp blends are generally useful, and particularly those having uniform absorption characteristics. Inkjet paper coatings for matte paper in particular can be advantageously formulated to employ the non-siliceous surface treated pigments described herein. The surface treated pigments of the present invention also may be suitable for coating compositions for some high gloss papers, depending on the print specifications.

The aqueous inkjet printing inks and dyes used in connection with paper coatings containing the surface treated pigments according to this invention may be formulated in a conventional manner with the understanding that anionic inks are preferred, and the inks may include additives such as surface active agents, solubilizing agents, humectants and so forth.

Papers coated with treatments containing the pigments provide rapid ink vehicle absorption and ink dye fixation on the surface. High density, uniform, fast-drying, and non-feathering ink images with enhanced water fastness are attained. The pigments of this invention are effective functional replacements for more expensive siliceous pigments when used in a high solids low binder content coating.

In addition, the pigments of the present invention fix dye-based inks in a manner that enhances water fastness that otherwise would be faced with untreated calcium carbonate in inkjet coating applications.

The low specific surface area pigment and low binder content of the paper coating compositions yields enhanced hiding power, which is manifested as a high coating whiteness considered attributable to the coating opacity attained over the print substrate.

In addition, the surface treated pigments according to this invention do not impart off-colors to print substrates while having low odor and low fluid viscosity in aqueous suspension form. By comparison, when many mineral pigments are treated with commercial cationic polymers, such as cationic polymers of quaternary amine and epichlohydrin, their inkjet printability, color densities, water fastness and coating makedown efficiency does increase. However, most cationic polymers carry varied amounts of active component in the range of 30-50% and their viscosities are different depending on molecular weight of the polymer used, which thus requires close monitoring when formulating the coating composition. In addition, and as a serious drawback, most cationic polymers are slightly colored in their liquid form ranging from pale orange colors to deep orange red colors. The inherited colors from such cationic polymers can influence the final coated sheet brightness. In addition the non-uniform absorption of the ink by organic cationic polymers can lead to problems with reproduction of the color gamut in the coating. The present permits reductions in the amount of cationic polymer used or reduces their undesired effects.

By contrast, such as for making high bright matte coated inkjet paper, the aluminum chlorohydrate and like polyvalent metal salts are a superior surface treatment agent for calcium carbonate pigments because, among other things, it remains in a clear solution while interacting with the contacted surfaces of the calcium carbonate particles to form positive charges thereon and interacts with all ink dyes in a way that closely reproduces the desired color gamut.

As such, the present invention provides a technique for modifying calcium carbonate particles to make them highly suitable inkjet printing applications.

EXAMPLES

The following examples are presented to illustrate the invention, but the invention is not to be considered as limited thereto. In the following examples, parts are by weight unless indicated otherwise.

Experimental tests were performed comparing coating formulations used for inkjet printing paper as applied in standard inkjet formulations versus with the inventive coating formulations containing surface treated pigments as described herein.

Example 1

As control runs, an initial series of tests were conducted on a number of different kinds of pigments that did not have surface treatments performed on them with a polyvalent metal salt of a Group II or III metal.

Coating formulations contained 100 parts of the pigment indicated in Table 1 along with 8 parts per hundred (pph) of a styrene-butadiene latex (i.e., per 100 parts pigment). The coating was applied to a base paper with a wire round rod and was applied at a coat weight of approximately 10 g/m$^2$.

Lab coated matte finished paper samples were produced using each respective pigment, and then printed with a HP model 820 Cse inkjet printer. The printer setting was set at normal print speed.

Table 1 below shows a respective pigment's affect observed on print density (yellow (Y), magenta (M), cyan (C), and black, ink drying, and print gloss, among other properties.

TABLE 1

| | Print Density | | | | Composite Ink | Printed image assessment | | | | Printer |
|---|---|---|---|---|---|---|---|---|---|---|
| Pigment | Yel. | Mag. | Cyan | Black | Density (Y + M + C) | Reversed text | Feathering | Bleed | Glossing | Drying |
| HG90 | 0.59 | 0.92 | 1.06 | 2.26 | 2.57 | Poor | No | No | Gloss | Slow |
| CG | 0.53 | 0.82 | 0.89 | 2.58 | 2.24 | Poor | Yes | No | Gloss | Slow |
| HC | 0.52 | 0.80 | 0.87 | 2.18 | 2.19 | Poor | Yes | No | Dull | Slow |
| CS40 | 0.51 | 0.83 | 0.91 | 2.19 | 2.25 | Poor | Yes | No | Semi-Gloss | Slow |

TABLE 1-continued

|  | Print Density | | | | Composite Ink | Printed image assessment | | | | |
| --- | --- | --- | --- | --- | --- | --- | --- | --- | --- | --- |
| Pigment | Yel. | Mag. | Cyan | Black | Density (Y + M + C) | Reversed text | Feathering | Bleed | Glossing | Printer Drying |
| CS80 | 0.45 | 0.79 | 0.86 | 2.18 | 2.10 | Poor | Yes | No | Dull | V. Slow |
| Nyacol F | 0.49 | 0.84 | 0.93 | 1.95 | 2.26 | Good | No | No | Matte | OK |
| 8044C | 0.46 | 0.78 | 0.90 | 1.32 | 2.14 | Good | No | No | Dull | OK |

Pigment Identifications:
HG90: Hydragloss ® 90 is a fine particle size high brightness coating kaolin sold by J.M. Huber Corporation
CG90: Covergloss ® is a narrow particle size high gloss high brightness coating kaolin sold by the J.M. Huber Corporation.
HC: Hydrocarb 90 is a fine particle size coating grade ground calcium carbonate (GCC) sold by OMYA, Inc.
CS40: Hubercarb ® CS-40 is a fine particle size coating PCC produced by the J.M. Huber Corporation.
CS80: Hubercarb ® CS-80 is a course particle size coating PCC produced by J.M. Huber Corporation.
Nyacol F: colloidal silicate.
8044C: Ultrafine hydrous kaolin with a particle size of 99%<1 micron produced by J.M. Huber Corporation.
Property Definitions:
"Print density" was determined by X-rite reflection densitometer.
"Composite ink density" was determined by the sum of three color densities (C.M.Y.).
"Reversed text" was determined by shrinkage of the white text in a colored background.
"Feathering" was determined by the fidelity of the a line with no artifacts associated with inks spreading.
"Bleed" was determined by fidelity of a black line in a yellow background. Bleed is an indication of drying rate.
"Glossing" was determined by Hunter Gloss meter which measures specular reflection of a surface.
"Printer drying" was determined by Visual observation on a solid print area.

The results in Table 1 show that untreated mineral pigments give low color print densities. Fine particle coating pigments, such as HG90, Covergloss and CS40, displayed good sheet and print gloss effect, but their ink drying rate was much slower than the other pigments. Slow ink drying rate can cause setoff problem when printed sheets pile up at the delivery tray. Setoff problem can become a bigger problem when multiple copies of print are produced with a faster inkjet printer. Therefore, HG90, Covergloss and CS40 were deemed not suitable for making matte finish coated inkjet paper. However, they can be a good pigment choice for glossy inkjet grade instead.

Table 1 also shows that untreated GCC, Nyacol treated spray dried clay (DP-8044) and Nyacol treated calcined clay, all produce matte finish coating with satisfactory ink drying rate. Untreated ground calcium carbonate was much brighter in color than clay pigments.

Figure 4:
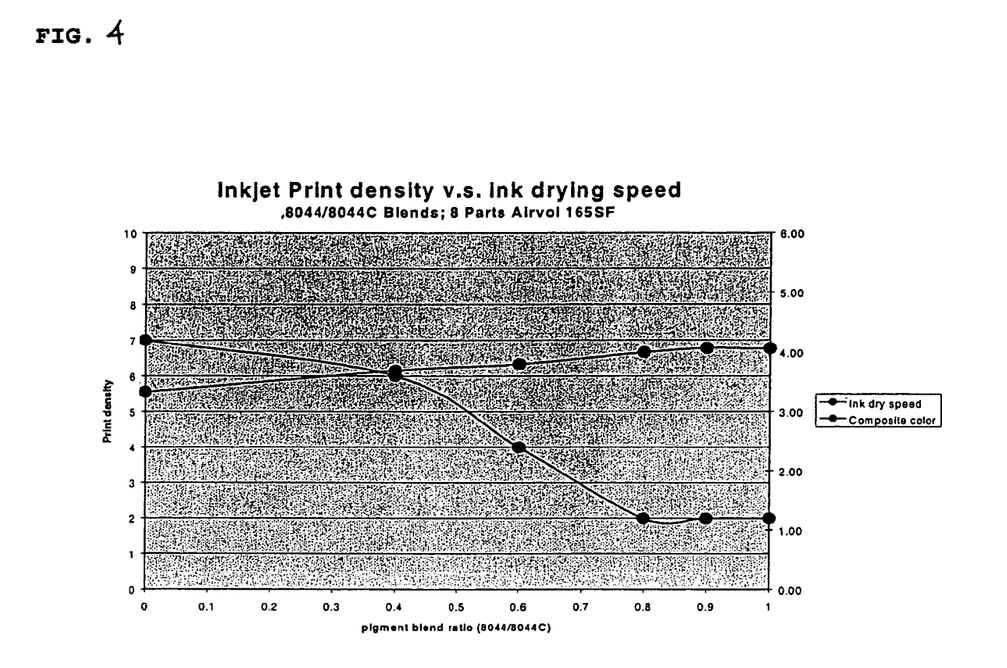
FIG. 4 is a plot illustrating various blends of fine and structured clay and their impact on print ink densities and ink drying rate as described in an Example herein.

FIG. 4 is a plot that illustrates the inverse relationship between inkjet print color density and ink drying rate using different blends of fine and calcined clays.

A fine-pigment provides better particle packing and creates higher ink holdout on the coating surface. The trade off is a gain in ink print densities but a slower ink drying rate. This relationship also indicates that optimization of the coating to achieve the best ink density and drying rate requires carefully balance of coating pore structure.

Example 2

A further series of experiments was conducted to compare the print performance achieved using surface treated UFGCC pigments.

Table 2 lists four different types of cationic materials that were used to surface treat four different respective samples of ultra fine ground calcium carbonate (UFGCC) for which the inkjet color densities were measured and reported. Data shown here was based on a surface treatment using a 2% by weight level of cationic agent in the surface treatment medium in which the GCC particles were dispersed. ACH was used to treat one UFGCC sample while the other three samples were treated with one of several types of polyquaternary amines, which were AGEFLOC B50LV produced by Ciba Specialty chemical water treatment Ltd.; 261LV produced by Nalco; and CP-2.

The UFGCC used was a commercial product, Hubercarb FG-1, produced by the J.M. Huber Corporation. This material was produced by making the GCC down in a 5 h.p. Cowles dissolver (Model W-14-2) made by dispersion by Design, Inc. The sample was made down in a 15 inch square can in which water was added, and then UFGCC was added in sufficient quantity to reach 30% solids. The mixture was then mixed for 20 minutes at 3000 rpm. 8% (as supplied) ACH ingredient was then added slowly to the mixture while continuing to mix a reduced speed (~1500 rpm). Alternatively, one of the polyquaternary amines was added to the given sample. Speed was increased again to 3000 rpm and material mixed for an additional 60 minutes after which it was spray dried on a Niro Spray Dryer.

Lab coated matte finished paper samples were produced using each of the various surface-treated UFGCC coating pigments using the method as described in Example 1, and then printed with a HP model 820 Cse inkjet printer. The printer setting was set at normal print speed.

TABLE 2

|  | Print Density | | | | Composite |
| --- | --- | --- | --- | --- | --- |
| Cationically treated UFGCC | Yel. | Mag. | Cyan | Black | (Y + M + C) |
| 2% CP-2/UFGCC | 0.93 | 1.28 | 1.37 | 1.62 | 3.57 |
| 2%261LV/UFGCC | 0.92 | 1.33 | 1.40 | 1.58 | 3.64 |
| 2% ACH/UFGCC | 0.84 | 1.19 | 1.30 | 1.48 | 3.33 |
| 2% Agefloc B50LV/UFGCC | 0.85 | 1.24 | 1.34 | 1.52 | 3.43 |

When comparing Tables 1 and 2, it is noted that all cationically treated pigments show much higher color ink densities than untreated pigments. Cationic material is considered as an essential ingredient for both coated and uncoated inkjet papers. Table 2 also shows that the ACH treated UFGCC renders slightly lower but competitive and effective inkjet print densities, but its significant cost advantage and charge efficiency make it a more preferable chemical for treating UFGCC coating pigments.

Example 3

In another series of experiments, the affect of ACH cationic material dosage on print color densities and ink drying rate was experimentally investigated.

Digital printing was conducted in a similar manner as described in the prior examples and color printing results are summarized in Table 3 below.

TABLE 3

| % ACH Treatment | Print color densities | | | | Composite colors (Y + M + C) |
|---|---|---|---|---|---|
| | Yellow | Magenta | Cyan | Black | |
| 4 | 0.69 | 1.01 | 1.12 | 1.56 | 2.82 |
| 6 | 0.69 | 1.03 | 1.14 | 1.59 | 2.85 |
| 8 | 0.73 | 1.08 | 1.25 | 1.65 | 3.06 |
| 12 | 0.81 | 1.13 | 1.28 | 1.62 | 3.22 |
| 16 | 0.89 | 1.20 | 1.29 | 1.63 | 3.39 |

As seen by the results in Table 3, when the amount of ACH is increased in the pigment, the print color densities of the coated paper also increased proportionally. High print color density is one of the key inkjet print quality parameters besides print resolution, ink feathering, color-to-color bleed and ink drying rate. The ACH dosage can be empirically optimized to achieve the best overall inkjet print quality and can be combined with other polymers to reduce cost.

Example 4

An additional series of experiments was conducted to examine the preparation of various coating formulations compositions including ACH-treated UFGCC coating pigment, and then print performance tests were conducted using various ones of these coating compositions against a commercially available matte coated inkjet paper.

Figure 5:
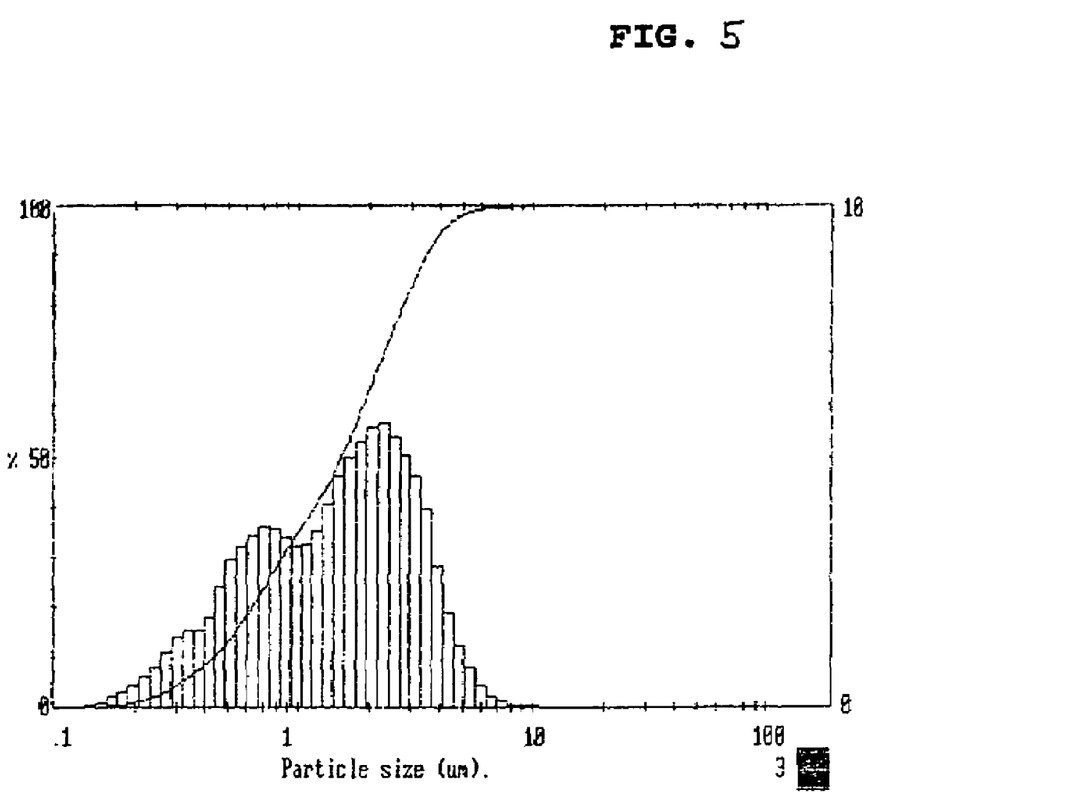
FIG. 5 is a graph representing the particle size distribution of an ultrafine ground calcium carbonate (UFGCC) as described in an Example herein.

UFGCC was obtained from Fairmount, Ga. as a dry, non-dispersed ultra-fine ground calcium carbonate (UFGCC). Mean particle size of this pigment was around 1.5 microns. FIG. 5 shows particle size distribution of the UFGCC, after the ACH-surface treatment as described in this example, as measured by Malvern particle sizer.

Procedures for making this treated product began with a slurry/water makedown. Untreated UFGCC was mixed with water in a mixing tank under a mild agitation with the use of a cowl blade to achieve a 30% pigment solid. Aluminum chlorohydrate (50% active) was then added gently to the mixed slurry. Mixing was continued, although the addition of ACH to the water/pigment slurry may cause a minor initial pigment flocculation. However, these soft flocs break down quite rapidly during the mixing.

Laboratory attempts to increase UFGCC/water slurry solids were tried but gelling occurred, i.e., a higher degree of pigment coagulation was experienced and the mixing operation could not be continued due to the rapid, high viscosity buildup. This attempt also explained that a high solid ACH treated UFGCC pigment slurry could not be achieved by simply adding ACH to a high solid untreated UFGCC/water slurry. Alternatively, it has been found that ACH can be added to liquid to which the dry pigment is added. As another alternative method, cationic polymer can be used to disperse the pigment first after which ACH can be added successfully as well. The cationic polymer was an epicholohydrin polyamine. DADMAC polymers or other quaternary polyamines also could be used.

Treated UFGCC pigment slurry was dried in a spray dryer to form dry powder. It also could be flash dried in suitable flash drying equipment.

The inkjet coating color was prepared as follows.

ACH treated UGFCC can be madedown to 60% slurry solids for making coating color. To form an inkjet coating color other coating ingredients such as binder, viscosity modifier, optical brightening agent and crosslinker are added to the slurry. Extra care is needed when designing a coating color since a positively charged pigment such as the treated UFGCC may neutralize with negatively charged ingredients such as binders, insolubilizer and OBA. From a lab screening when mixing diluted ACH solutions with each of the coating ingredients, it was observed that coating starches such as PG290 and polyvinyl alcohol binders are compatible. Most styrene butadiene latexes are slightly incompatible but other types of latexes such as vinyl acetate and vinyl acrylate are incompatible. Crosslinker such as AZC is not compatible with ACH and will cause severe coating precipitation. Incompatible coating ingredients should not be used in a coating formulation since flocculation will occur and forms gritty aggregates. Occasionally, a rapid viscosity jump has been observed which makes mixing impossible. SB latexes should be added immediately after the starch so that sudden viscosity build can be avoided.

Coating Compositions 1, 2 and 3 below are examples of different coating formulations using surface-treated pigments according to this invention that were used for coating matte finished inkjet papers.

Coating Composition 1: Matte Coated Inkjet Coating Formulation

| | |
|---|---|
| 8% ACH treated UFGCC | 100 parts |
| Cationic polymer (PRP2550) | 16.8 parts |
| ACH303 (sol.: ~50% ACH solids) | 13 parts |
| Crosslinker(Cartabond TSI) | 1-2 parts |
| Alkyl ketene dimer (AKD) (Raisofob8105) | 1 part |
| Styrene-butadiene (SB) Latex (Dow 383NA) | 6 parts |
| Polyvinylalcohol (PVA)(Airvol 205) | 6 parts |
| | ~144 parts total |

Note:
1 part = 1 dry gram of dry material used. ACH303 is commercial product Summit ACH303.

The pigment slurry, and the following ingredients, had the following solid contents in their respective dispersed forms as used in coating composition 1:

Pigment slurry 60%; Cationic polymer solid 50%; ACH303 solid 50%; Cartabond TSI solid 45%; AKD (cationic sizing agent) solid 50%; SB latex solid 50%; PVA solid 20%.

Coating Composition 2: Matte Coated Inkjet Coating Formulation

| | |
|---|---|
| 8% ACH treated UFGCC | 100 parts |
| Cationic polymer (PRP2550) | 16.8 parts |
| ACH303 | 19.5 parts |
| Crosslinker(Cartabond TSI) | 1-2 parts |
| AKD(Raisofob8105) | 1 part |
| Polyvinyl Acetate(Airflex7200) | 12 parts |
| PVA(Airvol205) | 4 parts |
| | ~155 total parts |

Note:
1 part = 1 dry gram of the material used

The pigment slurry, and the following ingredients, had the following solid contents in their respective dispersed forms as used in coating composition 2:

Pigment slurry 60%; Cationic polymer solid 50%; ACH303 solid 50%; Cartabond TSI solid 45%; AKD solid 50%; PVAc (Airflex 7200) solid 72%; PVA solid 20%.

Coating Composition 3: Matte Coated Inkjet Coating Formulation

| | |
|---|---|
| 8% ACH treated UFGCC | 100 parts |
| Cationic polymer (PRP2550) | 16.8 parts |
| ACH303 | 19.5 parts |
| Crosslinker(Cartabond TSI) | 1-2 parts |
| AKD(Raisofob8105) | 1 part |
| Polyvinyl Acetate(Airflex1082) | 15 parts |
| | ~154 total parts |

Note:
1 part = 1 dry gram of the material used

The pigment slurry, and the following ingredients, had the following solid contents in their respective dispersed forms as used in coating composition 3:

Pigment slurry 60%; Cationic polymer solid 50%; ACH303 solid 50%; Cartabond TSI solid 45%; AKD solid 50%; PVAc (Airflex 1082) solid 50%; PVA solid 20%.

For paper coating and finishing, a high bright base sheet that was lightly internal sized should be used for making matte finished coated inkjet paper. Typical coat weight between 16-20 grams per square meter per side is recommended depending on base sheet smoothness. A smoother base sheet requires less coating to get complete coverage while a rough sheet needs more coating. This coating color can be tailored for different types of coater blades, airknife or roll, and so forth.

Slight calendaring on the coated sheet can be used to enhance final sheet smoothness, but excessive calendaring is strongly not recommended as it will slow down the ink drying rate and may cause set off or color smearing.

Print tests on lab coated paper samples were done on HP color inkjet printer model 820 Cse and Epson 1270 stylus printer. The printing mode was set at normal printing speed, normal print quality and photo paper. If applied, the coatings were applied to a base paper with a wire round rod and was applied at a coat weight of approximately 10 g/m².

Table 4 shows inkjet test results for a commercial matte finish coated photo quality inkjet sheet (C1) using silica pigment, which was obtained from a commercial office supply store. Table 4 also shows results for a coated paper 1 ("1") that used ACH-treated UFGCC coating pigment, which represented the invention. The base paper used in coated paper 1 was regular copy paper (i.e., 24 lb. paper produced by Weyerhaeuser Corporation), and the coating composition used was the above-described Coating Composition 1. The procedure used for the surface-treatment of the UFGCC and coating protocol was the same as that described in previous Example 3.

In the following Tables in the examples, the listing of the paper type alone means samples of it that were not coated with a composition described in these examples, while a listing of a coating composition means a sample in which the listed coating composition was applied to standard copy paper (at 60-80 gsm that was untreated with any surface treatment prior to the experimental coating being applied.

TABLE 4

Comparison of experimental coated sample and commercial coated paper inkjet print performance

| Matte | HP 820 Cse | | | | | Epson stylus 1270 | | | | |
|---|---|---|---|---|---|---|---|---|---|---|
| Paper | Cyan | Magenta | Yellow | Black | Composite | Cyan | Magenta | Yellow | Black | Composite |
| Coating Composition 1 | 1.36 | 1.40 | 1.13 | 1.60 | 3.89 | 1.55 | 1.42 | 1.00 | 1.40 | 3.97 |
| C1 | 1.58 | 1.55 | 1.14 | 1.35 | 4.27 | 1.66 | 1.48 | 1.08 | 1.31 | 4.22 |

The results in Table 4 demonstrate that the matte paper coated with a coating composition containing ACH-surface-treated UFGCC displayed effective and competitive color printing performance to the commercial coated paper using relatively expensive silica pigment and coated at low solids.

Print quality could be influenced significantly by the inkjet printer design. Differences in printers include ink types, printer's speed, imaging enhancement algorithm and drop sizes. The Epson stylus 1270 printer seemed to be a faster color inkjet printer and its print head moved in both directions. Faster printer speed makes ink drying rate more demanding.

Example 5

In another series of experiments, the protocol described in Example 4 was repeated and then digital printing was conducted in a similar manner as described in the prior examples except that color printing was performed here on Epson Photo Quality Inkjet paper, HP BrightWhite, and Epson Premium Bright White papers as the commercial papers, and with printing done on an HP1220C Deskjet printer and on an Epson Stylus Photo 1270 printer. Standard Copy paper was coated in separate samples with one of each of coating compositions 1, 2 and 3 to assess the affects of the coating compositions on the print properties of the paper. The color printing results are summarized in Table 5 below.

TABLE 5

| | HP1220 C Deskjet | | | | | Epson Stylus Photo 1270 | | | | |
|---|---|---|---|---|---|---|---|---|---|---|
| | Black | Cyan | Magenta | Yellow | Composite | Black | Cyan | Magenta | Yellow | Composite |
| Epson Photo Quality Inkjet Paper | 1.56 | 1.34 | 1.59 | 1.13 | 4.06 | 1.56 | 1.34 | 1.59 | 1.13 | 4.06 |
| Coating Composition 1 | 1.58 | 1.27 | 1.43 | 1.10 | 3.80 | 1.58 | 1.27 | 1.43 | 1.10 | 3.80 |
| Coating Composition 2 | 1.67 | 1.21 | 1.45 | 1.13 | 3.79 | 1.67 | 1.21 | 1.45 | 1.13 | 3.79 |
| Coating Composition 3 | 1.67 | 1.25 | 1.36 | 1.06 | 3.67 | 1.67 | 1.25 | 1.36 | 1.06 | 3.67 |
| HP Bright White | 1.56 | 1.09 | 1.27 | 0.98 | 3.34 | 1.56 | 1.09 | 1.27 | 0.98 | 3.34 |
| Epson Premium Bright White | 1.54 | 1.19 | 1.28 | 1.00 | 3.47 | 1.54 | 1.15 | 1.27 | 1.01 | 3.43 |

Example 6

In another series of experiments, the protocol described in Example 4 was repeated and then digital printing was conducted in a similar manner as described in the prior examples except that coating at approximately 2 gsm (g/M$^2$) was instead used, and color printing was performed here on HP Brightwhite Epson Photo Quality Inkjet paper, Epson Premium Bright White paper, and uncoated woodfree base paper ("copy paper") as the substrate papers, and with printing done on an HP950C Deskjet printer and an HP1220C Deskjet printer. The color printing results are summarized in Table 6 below.

TABLE 6

| | HP 950C Deskjet | | | | | HP 1220C Deskjet | | | | |
|---|---|---|---|---|---|---|---|---|---|---|
| Sample | Black | Cyan | Magenta | Yellow | Composite | Black | Cyan | Magenta | Yellow | Composite |
| HP Brightwhite | 1.51 | 1.17 | 1.19 | 0.88 | 3.24 | 1.60 | 1.10 | 1.11 | 0.83 | 3.04 |
| Epson Premium Bright | 1.29 | 1.28 | 1.27 | 0.92 | 3.47 | 1.52 | 1.25 | 1.23 | 0.85 | 3.33 |
| Copy Paper | 1.10 | 1.10 | 1.13 | 0.86 | 3.09 | 1.49 | 1.08 | 1.09 | 0.79 | 2.96 |
| Coating 5 | 1.53 | 1.26 | 1.27 | 0.91 | 3.44 | 1.54 | 1.22 | 1.22 | 0.89 | 3.33 |
| Coating 4 | 1.55 | 1.30 | 1.25 | 0.96 | 3.51 | 1.58 | 1.25 | 1.23 | 0.90 | 3.38 |

Coating Formulation 4

(component/parts):

| | |
|---|---|
| 8% ACH Treated UFGCC TRAMFLOC F864 | 100 |
| Quaternary Amine | 8 |
| Cartabond TSI (50% Solid) | 3 |
| Airvol 203 (PVA) | 7.2 |

Coating Formulation 5

(component/parts):

| | |
|---|---|
| 17% ACH Treated UFGCC TRAMFLOC F864 | 100 |
| Quaternary Amine | 6.8 |
| Cartabond TSI (50% Solid) | 1.9 |
| Airvol 203 | 6.1 |

Example 7

In another series of experiments, three separate pigment compositions were prepared according to different addition schemes to investigate the effect of the timing of the addition of the cationic polymer, and the surface treatment of the pigments, on the viscosity and thixotropic properties of the pigment compositions. In this respect, the following different make down procedures were conducted. Procedure 1 generally followed the process scheme indicated in FIG. 2 in which the pigment (UFGCC) was surface treated with the polyvalent metal salt (ACH) before being combined with cationic polymer (TRAMFLOC 864). Procedure 2 generally followed the process scheme indicated in FIG. 3. in which the untreated pigment was mixed with a cationic polymer before ACH treatment of the pigments. In comparative procedure A, ACH and the cationic polymer were added and mixed simultaneously with a slurry of the pigment. The rate of addition of the cationic polymer to the pigment in these procedures was 55 cc/min/500 grams of pigment. For these procedures, the UFGCC pigment was surface treated with 8% ACH in the same manner as described in the preceding example 4. No other ingredients were included in these compositions. The viscosity results, measured at two different speeds, and % solids values at which the various compositions above which gelling would occur such that viscosity would be measurable, are indicated in Table 7.

TABLE 7

| | Brookfield Viscosity | | |
|---|---|---|---|
| Run | 20 rpm | 100 rpm | % solids |
| Procedure 1 composition | 2150 | 660 | 55.7 |
| Procedure 2 composition | 3878 | 1130 | 48.1 |
| Procedure A Composition | 3550 | 940 | 38.7 |

As illustrated by the above examples, the method for making aluminum chlorohydrate-treated ultra fine ground calcium carbonate pigment was experimentally implemented in a successful manner. The process of treating UFGCC according to this invention is facile in that it only requires simple high shear mixer with the option of drying the material for sale. This use of a particular GCC material, coupled with the treatment with polyvalent metal ion and in combination of a high solids low binder coating is extremely crucial for obtaining high coating solid and it enhances key print properties such as printing ink densities, print resolution and water fastness resistance. Aluminum chlorohydrate-treated UFGCC was demonstrated to be an effective coating pigment for replacing silica pigment. It also minimizes the dusting issue raised by silica usage and makes it possible to avoid a complex coating makedown process. ACH treated UFGCC also increases final coating color solid content to 45% by weight or higher, and even 50% by weight or higher; therefore, it makes other coating process such as blade coater, jet coater and the like viable for producing matte grades of paper and the like.

It will be understood that various changes in the details, materials, and arrangements of the parts which have been described and illustrated herein in order to explain the nature of this invention may be made by those skilled in the art without departing from the principles and scope of the invention as expressed in the following claims.

What is claimed is:

1. A particulate pigment suitable for use in ink recording medium coating compositions, comprising an inorganic particulate component treated at least partially on its surface with a water-soluble polyvalent metal salt, wherein said treated surface exhibits a cationic surface charge and the salt is a salt of a metal of Group II or Group III of the Periodic Table, said inorganic particulate component selected from the group consisting of calcium carbonate, aluminum trihydrate and magnesium hydroxide, individually or a combination thereof.

2. The pigment according to claim 1, wherein the inorganic particulate comprises ground calcium carbonate (GCC).

3. The pigment according to claim 1, wherein the inorganic particulate comprises precipitated calcium carbonate (PCC).

4. The pigment according to claim 1, wherein the inorganic particulate comprises calcium carbonate particles having a surface area of less than 15 $m^2/g$.

5. The pigment according to claim 1, wherein the water-soluble polyvalent metal salt comprises aluminum chlorohydrate.

6. The pigment according to claim 1, wherein the inorganic particulate having treated surfaces is in dried powder form.

7. An aqueous coating composition for an inkjet recording medium comprising an aqueous suspension of an inorganic particulate pigment and a binder, wherein said inorganic particulate pigment is produced prior to introduction of said pigment into said aqueous suspension, and wherein said inorganic particulate pigment comprises an inorganic particulate component treated at least partially on its surface with a water-soluble polyvalent metal salt, wherein said treated surface exhibits a cationic surface charge and the salt is a salt of a metal of Group II or Group III of the Periodic Table, and the binder comprises a material selected from an anionic binder or a nonionic binder.

8. The coating composition of claim 7, wherein the inorganic particulate comprises calcium carbonate, the polyvalent metal salt comprises aluminum chlorohydrate, and the binder is selected from styrene-butadiene rubber, starch, polyvinyl acetate, acrylic polymer, or polyvinyl alcohol, individually or in a combination thereof.

9. The coating composition of claim 7, wherein the inorganic particulate comprises calcium carbonate particles having a surface area of less than 15 $m^2/g$, the polyvalent metal salt comprises aluminum chlorohydrate, and the binder is selected from styrene-butadiene rubber, polyvinyl acetate, acrylic polymer, polyvinyl alcohol, individually or in a combination thereof.

10. The coating composition of claim 7, wherein the coating composition contains, on a solids basis, the surface treated inorganic particulate in an amount of about 45 to about 70% by weight.

11. The coating composition of claim 7, wherein the binder comprises an anionic binder in an amount of about 5 to about 12% by weight of composition, and a cationic polymer comprising a quaternary amine compound in an amount of about 5 to about 15% by weight, on a solids basis.

12. A coating composition of claim 7, applicable by blade coater, rod coater, film coater, metered size press, spray coater, air knife coater, or other high solids coating devices.

13. An ink recording medium coated on at least one face thereof with a coating composition as claimed in claim 7.

14. An ink recording medium as claimed in claim 13, wherein the recording medium sheet comprises inkjet paper.

15. An ink recording medium as claimed in claim 13, wherein the recording medium comprises matte finished inkjet paper.

* * * * *